US011970109B2

(12) United States Patent
Lara-Cabeza et al.

(10) Patent No.: US 11,970,109 B2
(45) Date of Patent: Apr. 30, 2024

(54) ELECTRONIC DEVICE AND AUTOMOTIVE LIGHTING DEVICE

(71) Applicant: VALEO VISION, Bobigny (FR)

(72) Inventors: Juan Lara-Cabeza, Bobigny (FR); Antonio Domingo Illan Cabeza, Bobigny (FR); Miguel Angel Peña Pulido, Bobigny (FR)

(73) Assignee: VALEO VISION, Bobigny (FR)

( * ) Notice: Subject to any disclaimer, the term of this patent is extended or adjusted under 35 U.S.C. 154(b) by 71 days.

(21) Appl. No.: 17/772,507

(22) PCT Filed: Oct. 29, 2020

(86) PCT No.: PCT/EP2020/080333
§ 371 (c)(1),
(2) Date: Apr. 27, 2022

(87) PCT Pub. No.: WO2021/083984
PCT Pub. Date: May 6, 2021

(65) Prior Publication Data
US 2022/0379803 A1 Dec. 1, 2022

(30) Foreign Application Priority Data
Oct. 29, 2019 (FR) ........................ 1912124

(51) Int. Cl.
*B60Q 1/38* (2006.01)
*H05B 45/33* (2020.01)
*H05B 45/34* (2020.01)

(52) U.S. Cl.
CPC ............. *B60Q 1/382* (2013.01); *H05B 45/33* (2020.01); *H05B 45/34* (2020.01)

(58) Field of Classification Search
CPC . B60Q 1/382; B60Q 1/00; B60Q 1/34; H05B 45/33; H05B 45/34; H05B 45/30; H05B 47/10
See application file for complete search history.

(56) References Cited

U.S. PATENT DOCUMENTS

| 10,351,050 B1 * | 7/2019 | Elwell ................. B60Q 1/2615 |
| 2013/0200792 A1 | 8/2013 | Brooks |
| 2015/0115795 A1 | 4/2015 | Roger |

FOREIGN PATENT DOCUMENTS

FR     3 012 717 A1    5/2015

OTHER PUBLICATIONS

"Schottky Diode Characteristics and Applications", Schottky Diodes, May 28, 2019, Wolfspeed, 5 pages (Year: 2019).*
International Search Report dated Jan. 20, 2021 in PCT/EP2020/080333 filed on Oct. 29, 2020, 3 pages.

* cited by examiner

*Primary Examiner* — Daniel D Chang
(74) *Attorney, Agent, or Firm* — Oblon, McClelland, Maier & Neustadt, L.L.P.

(57) ABSTRACT

An electronic device for an automotive lighting device, including a driver and a mixer. The driver includes a power and signal input and has a supply voltage threshold, in such a way that the microcontroller is configured to reset if the voltage value in the power and signal input is lower than the supply voltage threshold. The mixer includes an output connected to the power and signal input of the driver, and is configured to provide an output signal which is related to the highest between the non-permanent signal and the permanent signal inputs.

20 Claims, 3 Drawing Sheets

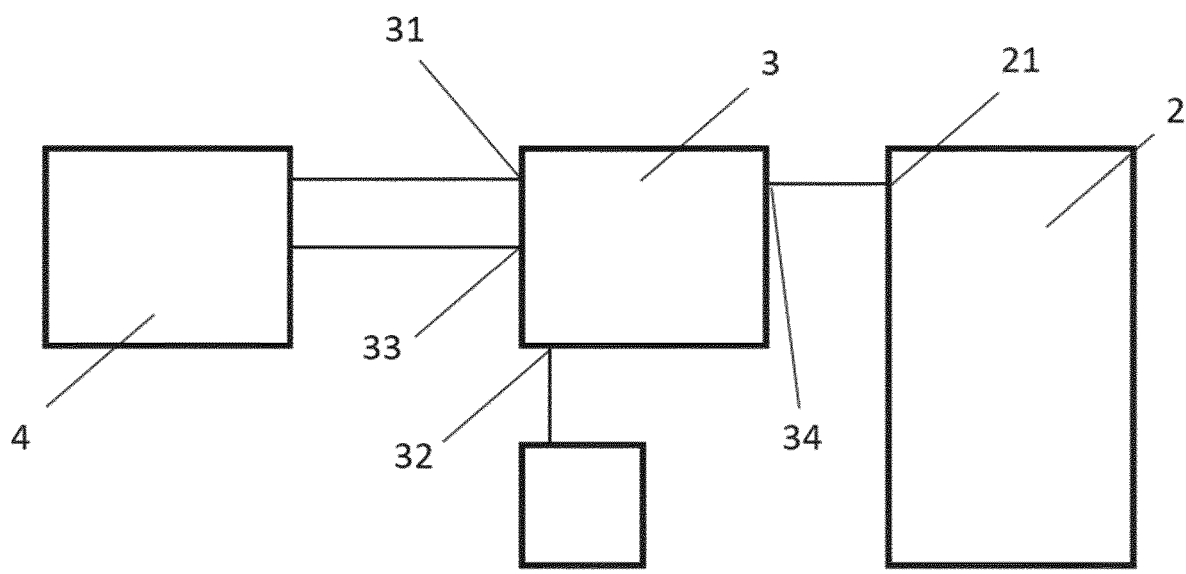
[Fig 1]

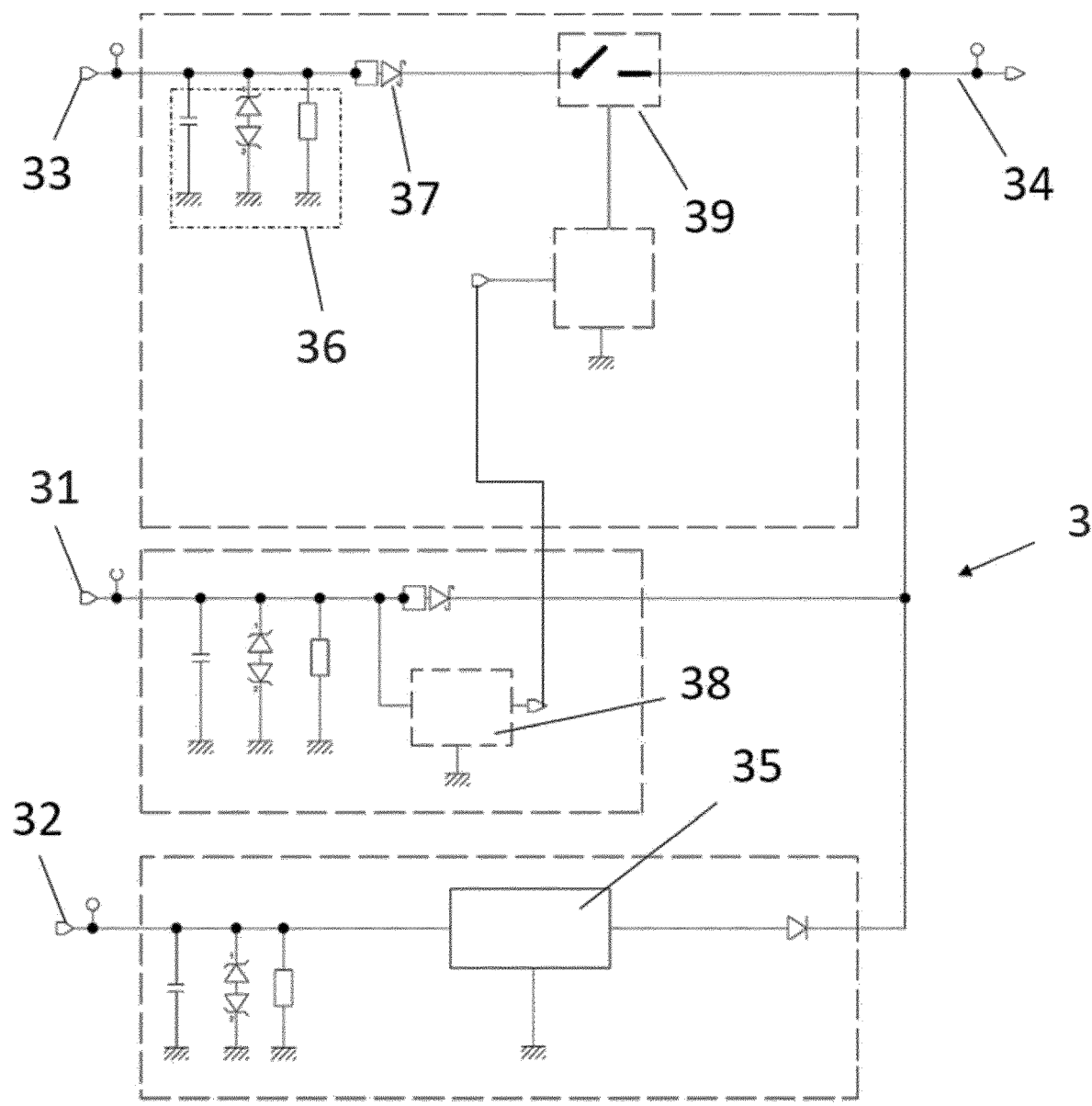
[Fig 2]

[Fig 3]
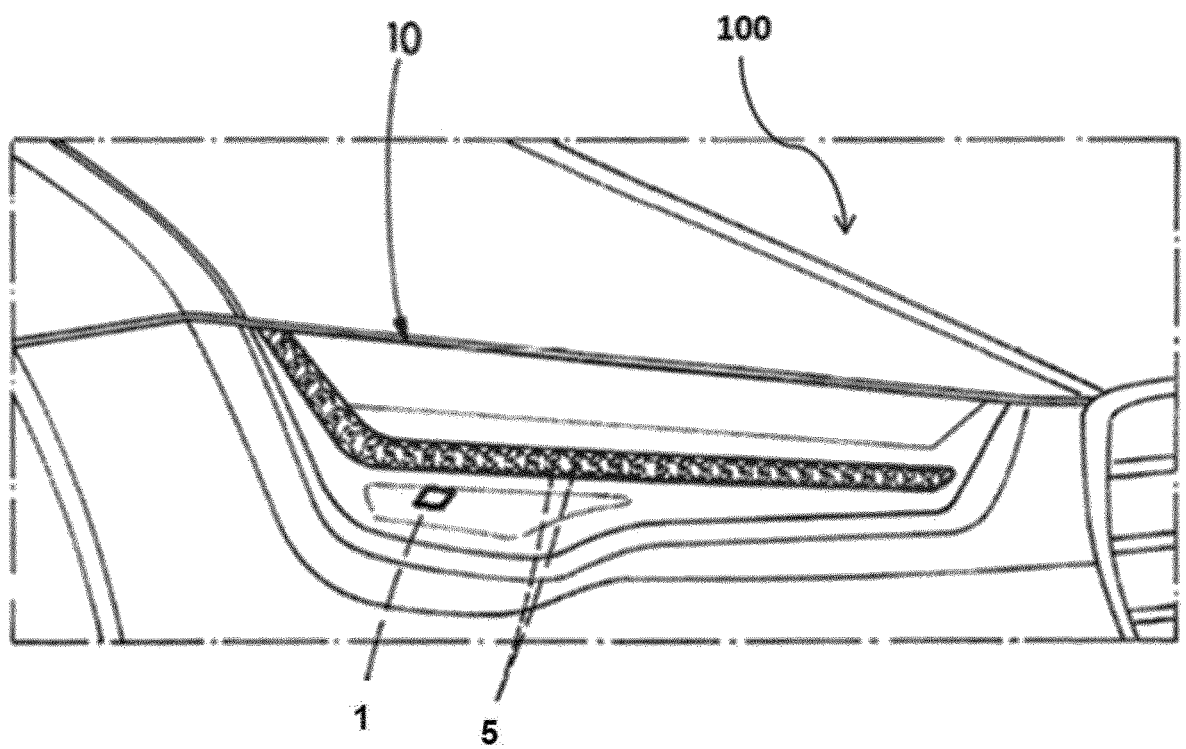

ELECTRONIC DEVICE AND AUTOMOTIVE LIGHTING DEVICE

This invention is related to the field of automotive lighting devices, and more particularly, to the electronic components comprised therein.

LED drivers are used to control, by means of a microcontroller, the activation of different independent lighting functionalities, such as Daytime Running Light (DRL) and Turning Indicator (TI). These drivers get the power supply from the actual function activation supply, so the system state memory is reset when both functions are disabled (for example, in the "off" cycles of the turning indicator operation). This reset prevents memory for recovering the running processes in next activation sequence of DRL or TI. If, for example, a derating process had started, the reset of the driver makes it "forget" this circumstance, so an auxiliary system or data store is needed.

A separate power line may also be used for keeping alive the microcontroller of the driver, but an extra input is needed.

The invention provides a solution for these problems by means of an electronic device according to claim 1 and an automotive lighting device according to claim 10. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides an electronic device for an automotive lighting device, the electronic device comprising:
- a driver comprising a microcontroller, the driver comprising at least one power and signal input, and the microcontroller having a supply voltage threshold, in such a way that the microcontroller is configured to reset if the voltage value in the power and signal input is lower than the supply voltage threshold;
- a mixer with an output connected to the power and signal input of the driver, the mixer comprising at least a first input and a second input;

wherein
- the first input of the mixer is configured to receive a non-permanent signal configured to provide information about a luminous functionality;
- the second input of the mixer is configured to receive a permanent signal higher than the supply voltage threshold; and
- the mixer is configured to provide an output signal which is related to the highest between the non-permanent signal and the permanent signal.

With such an electronic device, the voltage in the first input may fall below the supply voltage threshold, but since there is a second input connected to the mixer, the driver always receive a voltage higher than the supply voltage threshold in its power and signal input, and does not reset, without the need of an additional permanent power supply for the driver.

The power and signal input is called this way since it is a single input which receives power and electric signal in the same line: the electric signal contains information but is also used as power supply for the operation of the driver. This is the reason why if the voltage in this power and signal input falls below the supply voltage threshold, the driver resets.

If the voltage in the first input falls below the supply voltage threshold, the mixer provides at its output a voltage value which is related to the permanent signal of the second input, which is higher than the supply voltage threshold. Thus, the driver is able to distinguish when the voltage comes from the first input and when comes from the second input, but stays awake in any case.

When the non-permanent signal is enough to keep the microcontroller over the supply voltage threshold, is because the information of the non-permanent signal is relevant, so the output of the mixer, which becomes the input of the driver, is relative to the non-permanent signal.

In some particular embodiments:
- the mixer further comprises a third input configured to receive a further non-permanent signal configured to provide information about a further luminous functionality, and
- the mixer is also configured to provide an output signal related to the value of the further non-permanent signal when the third input receives a signal which is higher than the supply voltage threshold and higher than the first input.

In some cases, there is more than one non-permanent signal, and there are situations where both signals are under the supply voltage threshold, since they are coupled and one signal prevails over the other one. In this cases, the mixer ensures that the output always provides a signal higher than the supply threshold voltage.

In some particular embodiments, the mixer comprises a voltage stabilizer connected to each of the first input, second input and third input, each voltage stabilizer comprising a pair of Zener diodes, a capacitor and an impedance.

These voltage stabilizers ensures a stable voltage level in each of the mixer branches.

In some particular embodiments, the mixer comprises a voltage regulator connected to the voltage stabilizer of the second input.

This voltage regulator is in charge of converting the voltage level received in the second input to a voltage level acceptable for the device.

In some particular embodiments, the mixer comprises Schottky diodes.

These elements are useful for providing a logic operation to choose the highest voltage available.

In some particular embodiments, the electronic device further comprises a control unit which generates a turning indicator functionality, which feeds the first input of the mixer.

The control unit is in charge of providing the meaning to the signals, and in this case, the non-permanent signal is a turning indicator, which comprises phases of zero voltage.

In some particular embodiments, the electronic device further comprises a control unit which generates a PWM signal which provides a DRL functionality, which feeds the first input of the mixer.

The control unit is in charge of providing the meaning to the signals, and in this case, the non-permanent signal is a PWM signal, which comprises short phases of zero voltage.

In some particular embodiments, the mixer is comprised inside the driver.

Although it is not mandatory, the driver may be designed with this mixer, so that it receives the non-permanent signals and the permanent signal, and mixes them within the driver.

In some particular embodiments, the mixer comprises a diode and/or a transistor.

These semiconductor elements are suitable for managing the signals received.

In a further inventive aspect, the invention provides an automotive lighting device comprising
- an electronic device according to any of the first inventive aspect;
- a plurality of light sources controlled by the driver of the electronic device.

This lighting device comprises a driver which does not reset, so can be aware of ongoing processes without a further assistance.

In some particular embodiments, the light sources are solid-state light sources, such as LEDs.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

In some particular embodiments, the light sources are configured to provide a turning indicator functionality or a DRL functionality.

These functionalities are very common in current automotive vehicles, and are managed in the lighting device of the invention in such a way that their particular shape do not cause the reset of the driver.

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a general electric scheme of an electronic device for an automotive lighting device according to the invention.

FIG. 2 shows a scheme of operation of the mixer of the electronic device of FIG. 1.

FIG. 3 shows an automotive lighting device according to the invention installed in an automotive vehicle.

In these figures, the following reference numbers have been used:
1 Electronic device
2 Driver
21 Power and signal input of the driver
3 Mixer
31 First input of the mixer
32 Second input of the mixer
33 Third input of the mixer
34 Output of the mixer
35 Voltage regulator
36 Voltage stabilizer
37 Schottky diode
38 Turning indicator detector
39 Switch
4 Control unit
5 LED
10 Automotive lighting device
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

FIG. 1 shows a scheme of an electronic device 1 for an automotive lighting device according to the invention.

This electronic device 1 comprises a driver 2, a mixer 3 and a control unit 4.

The driver 2 comprises one power and signal input 21. This power and signal input 21 is configured so that the driver 2 receives an electric signal which is used both as the power supply to keep the driver 2 in operation and also as a signal information input to control the operation of the light sources which are connected to the outputs of the driver. The control unit 4 sends the signal information to activate or deactivate the corresponding lighting functionality.

The driver 2 is controlled by microcontroller which has a supply voltage threshold. The microcontroller is configured to reset if the voltage value in the power and signal input 21 is lower than the supply voltage threshold, so the aim of the invention is to keep the voltage in the power and signal input 21 higher than the supply voltage threshold, but without losing information regarding the lighting functionalities.

To provide a smart amount of voltage at the power and signal input 21, the output 34 of the mixer 3 is connected to the power and signal input 21 of the driver 2. This mixer comprises a first input 31, a second input 32 and a third input 33.

The mixer has an operator which selects the higher voltage level from the three inputs 31, 32, 33.

Since this permanent signal is higher than the supply voltage threshold of the microcontroller, the power and signal input 21 of the driver always receive a voltage which is higher than the supply voltage threshold. Hence, reset of the driver is avoided.

FIG. 2 shows a scheme of operation of the mixer 3. The mixer 3 receives three different signals in its inputs 31, 32, 33, as has been explained above.

The first input 31 receives a first signal of a turning indicator functionality generated by the control unit which was described in the previous figure.

The third input 33 receives a first signal of a DRL functionality, also generated by the control unit.

The second input 32 receives a permanent signal generated by the control unit. In some cases, this permanent signal may come directly from the power signal of the vehicle. For this or other cases where the second input receives a voltage with a voltage level which is not suitable for the application, the mixer 3 comprises an additional voltage regulator 35, which converts this permanent signal into a voltage level which is higher than the supply voltage threshold, but lower than the voltage level of the first and third inputs 31, 33.

The mixer 3 comprises a voltage stabilizer 36 connected to each of the first input 31, second input 32 and third input 33, each voltage stabilizer comprising a pair of Zener diodes, a capacitor and an impedance. Both the turning indicator branch and the DRL branch further comprise a Schottky diode 37.

As may be seen for the electronic implementation, in the cases both the DRL signal and the turning indicator signal are active, the turning indicator prevails over the DRL, and the DRL prevails over the permanent signal. Only when both turning indicator and DRL are off, the voltage at the output 34 of the mixer 3 corresponds to the permanent signal.

Since this permanent signal is higher than the supply voltage threshold of the microcontroller, the power and signal input 21 of the driver always receive a voltage which is higher than the supply voltage threshold. Hence, reset of the driver is avoided.

This configuration is achieved due to a turning indicator detection module 38 which is configured to detect the activation of the first input 31, and controls a switching element 39 located after the third input 33, and switches the signal output of the DRL branch.

FIG. 3 shows an automotive lighting device 10 according to the invention installed in an automotive vehicle 100.

This automotive lighting device 10 comprises an electronic device 1 as explained above, and a plurality of LEDs 5 controlled by the driver of the electronic device 1. These LEDs 5 perform DRL and TI functionalities.

The invention claimed is:

1. An electronic device for an automotive lighting device, the electronic device comprising:
a driver comprising a microcontroller, the driver comprising at least one power and signal input, and the microcontroller having a supply voltage threshold, the microcontroller being configured to reset if a voltage value in the at least one power and signal input is lower than the supply voltage threshold; and
a mixer having an output connected to the at least one power and signal input of the driver, the mixer comprising at least a first input and a second input, wherein
the first input of the mixer is configured to receive a non-permanent signal configured to provide information about a luminous functionality,
the second input of the mixer is configured to receive a permanent signal higher than the supply voltage threshold, and
the mixer is configured to provide an output signal related to a highest between the non-permanent signal and the permanent signal.

2. The electronic device according to claim 1, wherein:
the mixer further comprises a third input configured to receive a second non-permanent signal configured to provide information about a second luminous functionality, and
the mixer is configured to provide the output signal related to a value of the second non-permanent signal when the second non-permanent signal received by the third input is higher than the supply voltage threshold and higher than the first input.

3. The electronic device according to claim 2, wherein the mixer further comprises a voltage stabilizer connected to each of the first input, the second input and the third input, each voltage stabilizer comprising a pair of Zener diodes and a capacitor and having an impedance.

4. The electronic device according to claim 3, wherein the mixer further comprises a voltage regulator connected to the voltage stabilizer of the second input.

5. The electronic device according to claim 4, wherein the mixer comprises Schottky diodes.

6. The electronic device according to claim 3, wherein the mixer comprises Schottky diodes.

7. The electronic device according to claim 3, further comprising a control unit configured to generate a turning indicator functionality signal, the turning indicator functionality signal feeding the first input of the mixer.

8. The electronic device according to claim 3, wherein the mixer is comprised inside the driver.

9. The electronic device according to claim 2, wherein the mixer comprises Schottky diodes.

10. The electronic device according to claim 2, further comprising a control unit configured to generate a turning indicator functionality signal, the turning indicator functionality signal feeding into the first input of the mixer, wherein the control unit generates a pulse width modulation (PWM) signal providing a daytime running light (DRL) functionality, the PWM signal feeding into the third input of the mixer.

11. The electronic device according to claim 10, wherein the mixer further comprises a turning indicator detection module configured to control a switching element located after the third input.

12. The electronic device according to claim 2, further comprising a control unit configured to generate a turning indicator functionality signal, the turning indicator functionality signal feeding into the first input of the mixer.

13. The electronic device according to claim 2, wherein the mixer is comprised inside the driver.

14. The automotive lighting device comprising
the electronic device according to claim 2; and
a plurality of light sources controlled by the driver of the electronic device.

15. The electronic device according to claim 1, further comprising a control unit configured to generate a turning indicator functionality signal, the turning indicator functionality signal feeding into the first input of the mixer.

16. The electronic device according to claim 1, wherein the mixer is comprised inside the driver.

17. The automotive lighting device comprising
the electronic device according to claim 1; and
a plurality of light sources controlled by the driver of the electronic device.

18. The automotive lighting device according to claim 17, wherein the plurality of light sources are solid-state light sources.

19. The automotive lighting device according to claim 18, wherein the plurality of light sources are configured to provide a turning indicator functionality or a daytime running light (DRL) functionality.

20. The automotive lighting device according to claim 17, wherein the plurality of light sources are configured to provide a turning indicator functionality or a daytime running light (DRL) functionality.

* * * * *